United States Patent [19]

Crozier

[11] 3,878,439

[45] Apr. 15, 1975

[54] LIGHT CONTROLLED CIRCUIT

[75] Inventor: David F. Crozier, Chester Springs, Pa.

[73] Assignee: American Manufacturing Company, Inc., King of Prussia, Pa.

[22] Filed: Mar. 29, 1973

[21] Appl. No.: 345,881

[52] U.S. Cl. .................................................. 317/130
[51] Int. Cl. ............................................ H01h 47/26
[58] Field of Search .......... 317/130; 307/311; 328/2

[56] References Cited

UNITED STATES PATENTS 3,113,250 12/1963 Wood ................................ 317/130

*Primary Examiner*—L. T. Hix
*Attorney, Agent, or Firm*—Maleson, Kimmelman & Ratner

[57] ABSTRACT

The circuit includes a phototransistor, a Schmitt trigger operable in response to a changing condition of the phototransistor, an amplifying and timing subcircuit coupled to the Schmitt trigger, a uni-junction transistor acting as a threshold detector and a relay or other utilization circuit coupled to the amplifier and threshold detector circuits. The circuit may be set so that the timing subcircuit starts operation when the phototransistor changes from an illuminated condition to a non-illuminated condition, or vice versa. In another form the circuit does not contain a timing subcircuit but instead responds to a change in the phototransistor from an illuminated state to a non-illuminated state.

2 Claims, 3 Drawing Figures

LIGHT CONTROLLED CIRCUIT

BACKGROUND OF THE INVENTION

1. Field of the Invention

This invention relates to a control circuit and in particular to a control circuit whose condition is responsive to the presence or absence of light.

2. Prior Art

It is often desirable to have a control circuit responsive to light of a predetermined value above a threshold value. Past circuits designed for this purpose have employed sensitivity control subcircuits which have made them rather complex. Also, past circuits, especially when used for time delay purposes have had less than satisfactory temperature stability characteristics and were generally relatively expensive. It is therefore an object of the present invention to provide a circuit which is simpler than past circuits and does not require a sensitivity control, has good temperature stability characteristics and is less expensive then the prior art circuits.

SUMMARY OF THE INVENTION

A light-responsive circuit for actuating a utilization circuit comprises a light-responsive signal device, a Schmitt trigger sub-circuit coupled to said device, a switching means in circuit with said utilization circuit, a timing circuit coupled to the output of said Schmitt trigger and to said switching means, and a voltage threshold-detecting circuit also coupled to said switching means for preventing conduction therethrough until the voltage on at least one electrode thereof attains at least a predetermined minimum level whereupon said utilization circuit is energized. In another form the timing and threshold subcircuits are not included.

DETAILED DESCRIPTION OF THE DRAWINGS

Figure 1:
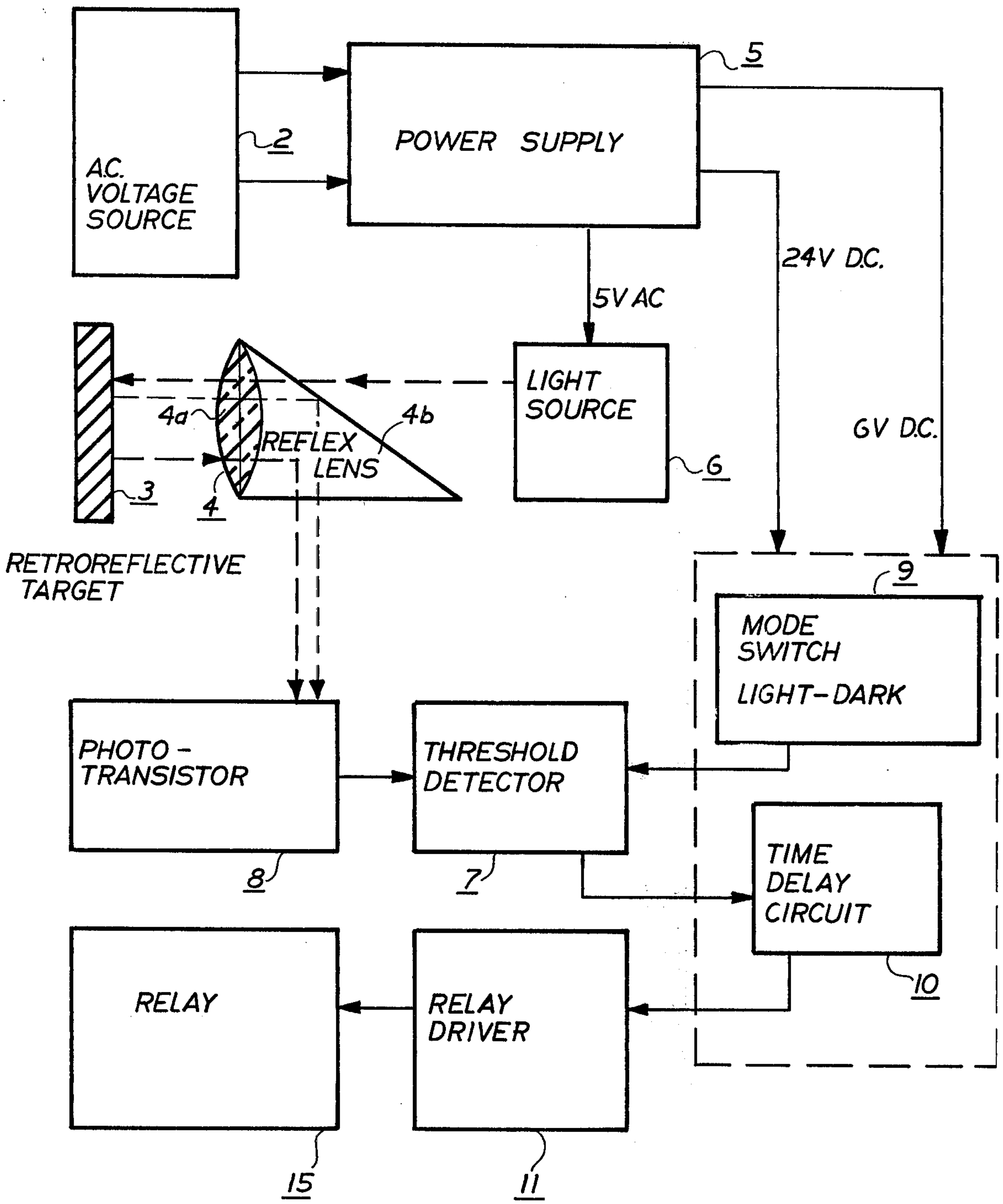
FIG. 1 is a block and schematic representation of several forms of the invention.

FIG. 1 depicts the overall relation of the various components of the invention as used in a typical environment. In such environment, a light source 6 may project light through an optical system 4 onto a retroreflective target 3. Light reflected from the target passes back through the lens 4*a*, strikes the reflecting surface 4*b* and is reflected onto a phototransistor 8. The signal produced by the phototransistor is amplified and applied to a threshold detector 7 and a time delay circuit 10. When the signal reaches an appropriate amplitude, the relay driver 11 is actuated which causes the relay 15 to operate at the end of the timing interval. The voltage source 2 and the power supply 5 operate to supply the necessary power for the light source and the other components of the relay driving circuit. The setting of the mode switch 9 determines whether the timing circuit 10 will commence operation when the state of the phototransistor changes from illuminated to nonilluminated or vice versa. The optical assembly 4 may be, for example, the projective-reflective assembly described and claimed in U.S. Pat. No. 3,819,272, issued June 25, 1974 to David F. Crozier and Peter J. Bergman entitled "PROJECTIVE-REFLECTIVE OPTICAL APPARATUS." Of course, it can be any alternative optical apparatus which is convenient, the present invention concerning only the circuit which responds to a signal originally induced by light change. In the form of the invention shown in FIG. 3, the time delay circuit 10, the threshold detector 7 and the mode switch 9 are not present and the relay 15 is operated whenever light ceases to fall on the phototransistor.

Figure 2:
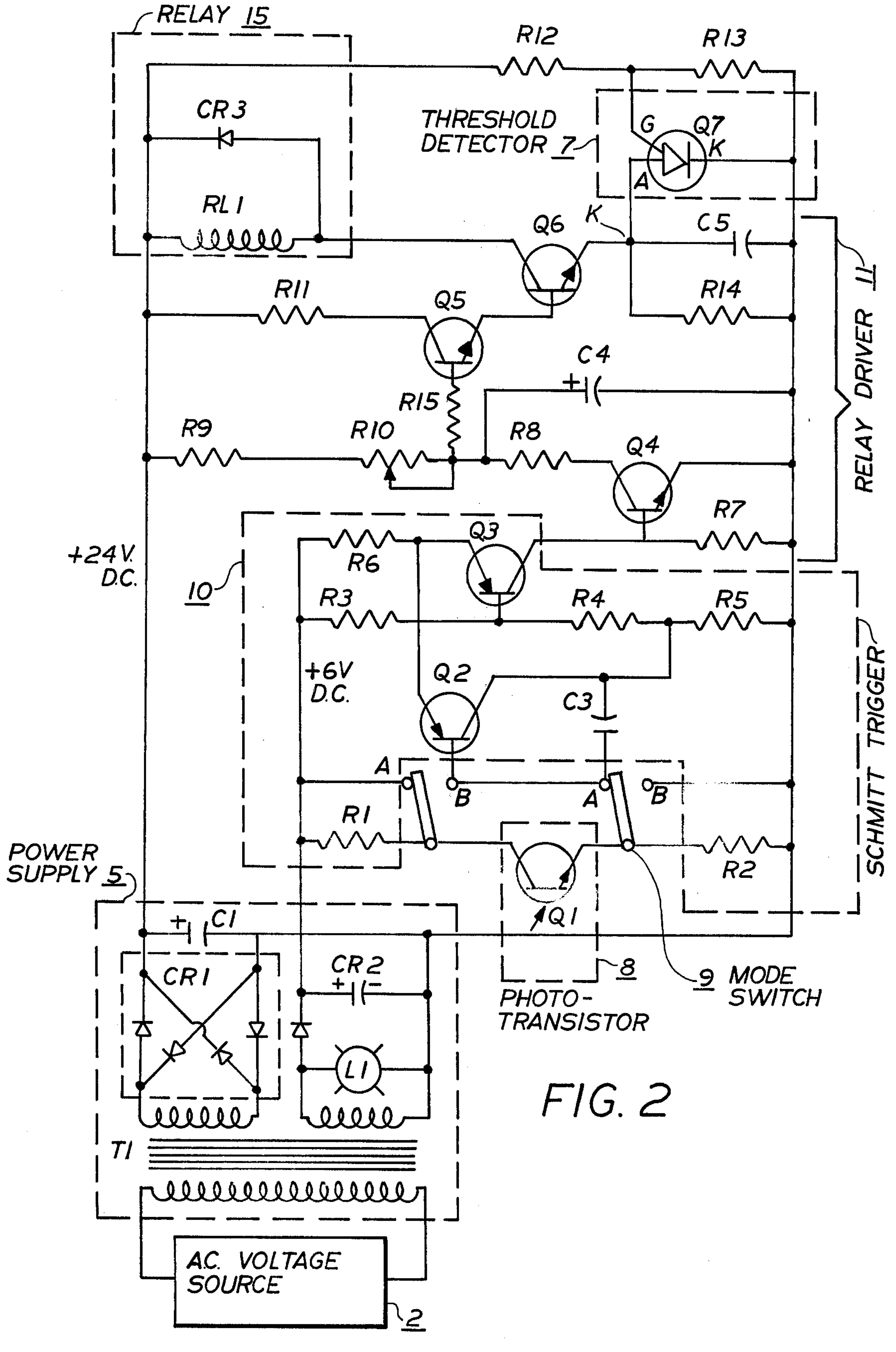
FIG. 2 is a schematic drawing of the time-delay form of present invention.

FIG. 2 — Time Delay Circuit — "A" Condition

Referring to FIG. 2, the AC voltage source 2 is coupled to the primary of a transformer T1 whose secondary is split. One portion of the secondary is connected to a bridge rectification circuit CR1 across whose output there is a filter capacitor C1. The high end of the capacitor is at +24 volts DC. The other section of the secondary uses a rectifier CR2 to produce +6V DC voltage at its output across which there is connected a resistor R1 in series with a phototransistor Q1 and another resistor R2. Also, the two arms of a mode switch 9 are connected respectively to the emitter and collector of Q1 and, as pictured, are shown touching the "A" contacts of the switch. This "A" condition is the "dark"-started delay mode, that is, the timing interval begins when the phototransistor goes from an illuminated to a non-illuminated condition.

While the light is on, Q2 is off since the current through the phototransistor Q1 causes the voltage at the upper end of resistor R2 to be relatively positive thereby causing the voltage on the base of transistor Q2 to be relatively positive. Transistor Q3 is biased "on" and current through its emitter-collector circuit is applied to the base of transistor Q4 turning the latter on. Resistors 8 and 9 and time-selection potentiometer 10 determine the bias on the base of transistor Q5. Conduction through transistor Q4 prevents any substantial charge from being built up across the timing capacitor C4. Q4 is a clamping transistor which, when conducting, effectively keeps the voltage on capacitor C4 at ground. At this time transistor Q5 is off due to the application of a relatively negative voltage to its base developed by the current passing through potentiometer R10. Since the emitter of Q5 is directly coupled to the base of Q6, the latter is also off so that no appreciable current flows through the relay coil RL1.

The resistance voltage-dividing network comprising R12 and R13 establish the threshold voltage on the gate of the programmable uni-junction transistor Q7 which must be exceeded by the anode voltage before the relay coil RL1 is energized. The anode of this threshold detector has a voltage dependent upon the amount of current passing through the high value resistor R14 which, in turn, depends upon conduction through transistor Q6. In the presence of light, the voltage on the anode Q7 is zero, and it is non-conductive.

When the light on phototransistor Q1 goes off, the voltage on the base of Q2 goes down because no current then passes through load resistor R2. This turns Q2 on and consequently more current flows through resistor R6 than did before. This lowers the voltage on the emitter of Q3 which is tied to the emitter of Q2. At the same time, more Q2 emitter-collector current flows through load resistor R5 thereby raising the voltage at its junction with R4 and consequently raising the voltage on the base of Q3 which tends to turn it off. The passage of relatively less current through resistor R6, due to the lessened conduction through Q3, causes the potential on the emitter of Q2 to rise so that more current is drawn through Q2. More current through Q2 means more current through R5 which drives the base of Q3 even more positive rendering it even less conductive. This is the regenerative effect characteristic of a Schmitt trigger circuit.

As Q3 turns off, so does Q4 to which it is directly coupled. The capacitor C4 then starts to charge up through resistor R9 and potentiometer R10 at a rate depending on the setting of the latter. This beginning of charging represents the beginning of the timing interval. As the voltage begins to build up on C4, it also rises on the base of transistor Q5 connected thereto. Therefore, Q5 will tend to turn on Q6, to which it is directly coupled. During this time capacitor C5 and resistor R14, which have values chosen to enable Q5 and Q6 to conduct very slightly, act to render the circuit less susceptible to RF noise pickup. This will, in turn, tend to produce more current flow through R14 which has a very high value of resistance. This additional current is, however, not enough to cause the relay to change condition. But it does start to raise the voltage on the anode of transistor Q7 until it eventually exceeds the voltage on the gate of Q7. When this happens, transistor Q7 switches on like a SCR and constitutes a very low impedance between the emitter of Q6 and ground. This, in turn, causes the voltage on the anode to go down considerably and heavy current (limited by resistor 11) then flows through the bases of transistors Q5 and Q6 until the latter saturates, the relay coil being energized by the flow of current through Q6. The capacitor C4 also discharges through Q5 and Q6 to ground, resistor R15 serving to limit the flow of current in this case. The timing interval lasts from the moment when the transistor Q4 turns off until the moment when Q6 begins to conduct heavily and the coil RL1 is energized to actuation. The relay coil RL1 stays energized until Q4 is again turned on which occurs when the state of the phototransistor again changes.

FIG. 2 — Time Delay — "B" Condition

In some instances it is desired to operate the circuit of FIG. 2 in a manner such that the timing interval, i.e., the beginning of the charging of C4, starts when light falls on the phototransistor. To do this, switch 9 is thrown to the "B" contact position. When the mode switch 9 is thrown into the "B" contact position it will be seen that the load resistor R2 is shorted and resistor R1 now becomes the load resistor for phototransistor Q1. In this condition, assuming Q1 is not illuminated, Q2 is off, Q3 and Q4 are on, Q5 and Q6 are off as is Q7 so that no appreciable current flows through RL1. Since Q4 is on, no charge will build up across C4 and the timing interval will not have begun.

When the light falls on Q1, current flows through R1 so its lower end and the base of Q2 become more negative thereby turning it on. When Q2 turns on, Q3 and Q4 turn off in the same manner that they do when the circuit is operated in the "A" condition as explained previously. When Q4 turns off the timing interval begins as capacitor C4 begins to charge up depending on the setting of the potentiometer. Also Q5 and Q6 start to conduct somewhat until the voltage on the anode of Q7 exceeds its gate voltage as in the "A" condition whereupon it conducts heavily and the rush of current through RL1 actuates the relay and C4 discharges through Q5 and Q6. The coil remains energized until the light is removed from the phototransistor whereupon Q4 turns on and the voltage on the anode of Q7 goes below the threshold.

Figure 3:
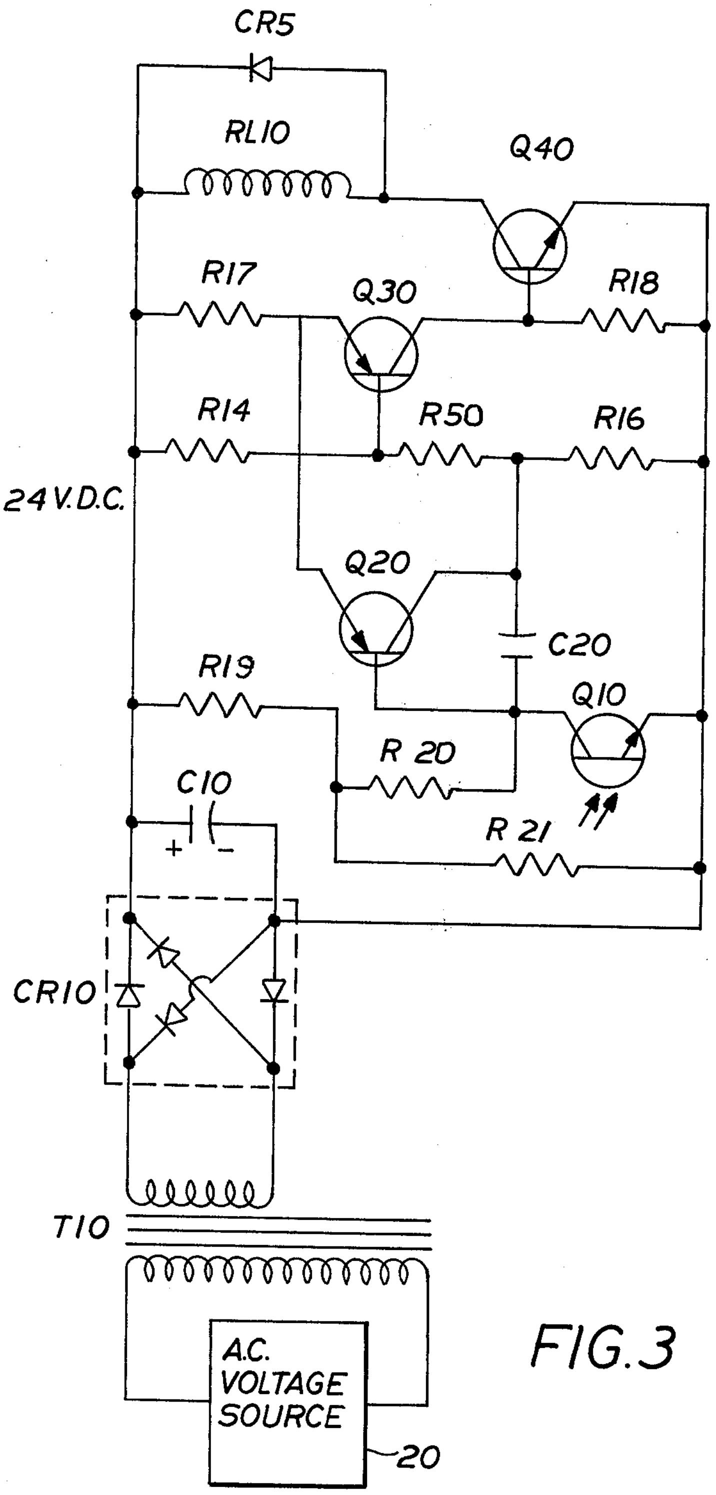
FIG. 3 is a schematic drawing of the standard (no time delay) form of the invention.

FIG. 3 — Standard On-Off Circuit

In FIG. 3 there is shown a form of the invention in which there is no time delay and hence no mode switch (FIG. 1 without the components in the broken line box). It is a direct on/off circuit which operates in the dark mode, i.e., the relay coil RL1 is energized in the absence of light impinging on phototransistor Q10. An AC source 20 is coupled to the primary of a transformer T10 whose secondary is connected to a rectifying bridge circuit CR10 across whose output a filter capacitor C10 is shunted. The output produces a +24 volt DC which is applied through the various resistors such as R19, R20, R21, R14, R15, and R17 to provide the proper biases on the transistors including phototransistor Q10 and transistors Q20, Q30 and Q40. Resistors R16 and R18 are load resistors.

When the phototransistor Q10 is not illuminated, its emitter-collector current is below 0.3 microamps and may be, perhaps on the order of 0.1 microamps. When it is not illuminated, transistor Q20 is cut off by virtue of the base voltage developed across resistors R19 and R20, R21 and the emitter voltage developed across resistor R17. However, in this condition, the base voltage developed across the voltage dividing network comprising R14 and R15 and the emitter voltage developed across R17 enable resistor Q30 to be conductive. Since the collector of Q30 is connected directly to the base of transistor Q40, it supplies current to the base of the latter thereby rendering it conductive. Since Q40 is conductive, current will flow through the relay coil RL10 to ground via transistor Q40.

When light falls upon the phototransistor Q10, current through that transistor goes up to a value of perhaps 3.8–4.0 microamps or greater and therefore current flows through R19 and R20 in series. This increase in current causes the lower end of R20 to go more negative and this lower voltage is applied to the base of transistor Q20 thereby tending to turn it on. As Q20 starts to turn on, more current is initially drawn through resistor R17 which has the effect of causing transistor Q30 to go off. As the latter transistor begins to go off, less current is then drawn through resistor 17 but proportionately more goes through the emitter-collector circuit of transistor Q20 thereby accentuating the switching action since Q20 conducts even more heavily. While the base voltage of transistor Q30 is going up, its emitter voltage is going down until it is cut off completely. At this point, since it is the curent source for transistor Q40, Q40 also turns off thereby deenergizing relay coil RL10. Diode CR5 prevents the voltage applied to transistor Q40 from exceeding its breakdown potential.

General Remarks

It should be noted that transistors Q10, Q20, Q30 and Q40 of FIG. 3 correspond substantially to transistors Q1, Q2, Q3 and Q4 of the embodiment shown in FIG. 2. Likewise, the resistors R14, R50 and R16 correspond generally to resistors R3, R4, and R5 of FIG. 2. Also, resistors R17 and R18 correspond generally to resistors R6 and R7 of FIG. 2 and the relay coil RL10 corresponds to coil RL1 of FIG. 2.

In practice, the following values of components have been found to be very satisfactory in the circuits of FIGS. 2 and 3 respectively:

FIG. 2

| Component | Type or Value | Component | Type of Value |
|---|---|---|---|
| CR1 | WO4 | R8 | 220 |
| CR2 | 1N914 | R9 | 6.8K |
| CR3 | 1N914 | R10 | 1meg |
| C1 | 100μfd | R11 | 15K |
| C2 | 64μfd | R12 | 33K |
| C3 | .005μfd | R13 | 82K |
| C4 | 15μfd | R14 | 100K |
| C5 | .022μfd | Q1 | OP632 |
| R1 | 820K | Q2 | MPSA65 |
| R2 | 820K | Q3 | 2N4248 |
| R3 | 20K | Q4 | GE3308 |
| R4 | 13K | Q5 | GE3308 |
| R5 | 7.5K | Q6 | GE3308 |
| R6 | 8.2K | Q7 | D13T1 |
| R7 | 15K | | |

FIG. 3

| Component | Type or Value | Component | Type or Value |
|---|---|---|---|
| CR10 | W04 | R50 | 27K |
| CR5 | 1N914 | R16 | 3K |
| C10 | 100μfd | R17 | 13K |
| C20 | .005μfd | R18 | 15K |
| R19 | 27K | Q10 | OP632 |
| R20 | 1.1meg | Q20 | MPSA65 |
| R21 | 47K | Q30 | 2N4228 |
| R14 | 36K | Q40 | GE3308 |

Of course, other forms and modifications of the invention as depicted herein, which do not depart from the essence of the present invention, will occur to one skilled in the art upon perusing the drawings and specification herein. Accordingly, it is desired that the invention be limited only by the following claims.

I claim:

1. A circuit comprising:

a. a branch including a load resistor and light-sensitive means for generating output signals corresponding to the light input condition of said light sensitive means, b. a Schmitt trigger circuit coupled to the output of said light-sensitive means, said trigger circuit including first and second switching means coupled to one another, said first switching means being coupled to said load resistor and changing condition whenever said light-sensitive means changes condition, said second switching means changing condition in response to a change in condition of said first switching means, said trigger circuit being directly coupled to said branch, c. a third switching means coupled to said second switching means which changes condition in response to a change in condition of said second switching means, and d. a utilization circuit coupled to said third switching means which is actuated in response to a predetermined change in the condition of said third switching means, said utilization circuit remaining acutated until said light-sensitive means next changes condition.

2. The circuit according to claim 1 wherein all of said switching means are solid state devices, wherein said utilization circuit is a coil and is in series with said third switching means, wherein there is additionally provided a timing subcircuit coupled to said second and third switching means which commences a timing operation as soon as said second switching means becomes non-conductive and further wherein there is a voltage-threshold-detection subcircuit coupled to said third switching means for preventing appreciable conduction through the latter until at least a predetermined minimal voltage appears on a selected electrode of said third means, said conduction thereupon energizing said coil.

* * * * *